ically placing below the electrode positions in the roof. By means of the invention replacement of the electrodes can take place without any personnel having to stay above the electrode roof.

United States Patent [19]
Tiberg

[11] 4,345,333
[45] Aug. 17, 1982

[54] METHOD AND APPARATUS FOR REPLACING THE ELECTRODES OF AN ELECTRIC ARC FURNACE

[75] Inventor: Magnus G. G. Tiberg, Hällefors, Sweden

[73] Assignee: Aktiebolaget SKF, Gothenburg, Sweden

[21] Appl. No.: 148,001

[22] Filed: May 8, 1980

[30] Foreign Application Priority Data

May 8, 1979 [SE] Sweden .............................. 7903987

[51] Int. Cl.³ .............................................. H05B 7/00
[52] U.S. Cl. ........................................ 373/94; 373/78
[58] Field of Search ................................ 13/9, 14–17, 13/18 R

[56] References Cited
U.S. PATENT DOCUMENTS

2,469,740  5/1949  Moore ...................................... 13/9
3,612,739 10/1971  Korneff .................................... 13/9
4,238,633 12/1980  Medovar et al. ................... 13/14 X Primary Examiner—Roy N. Envall, Jr.
Attorney, Agent, or Firm—Eugene E. Renz, Jr.

[57] ABSTRACT

The invention concerns a method and an apparatus for replacing the electrodes of an electric arc furnace.

Replacement of the electrodes in an electric arc furnace with an electrode roof (9) removable from the furnace shell takes place by moving the electrodes downwards and upwards through the electrode roof when removed from the furnace shell, in connection with removing and inserting the electrodes from and into their holders (13), respectively. An apparatus with a number of vertical tubes which can be placed below the removed electrode roof is arranged beside the furnace shell. Used electrodes can be lowered into some of the tubes and jointed replacement electrodes can be pushed up through the electrode roof from other tubes. The tubes are placed on a revolving disc (2) for alternating placing below the electrode positions in the roof. By means of the invention replacement of the electrodes can take place without any personnel having to stay above the electrode roof.

8 Claims, 4 Drawing Figures

METHOD AND APPARATUS FOR REPLACING THE ELECTRODES OF AN ELECTRIC ARC FURNACE

The present invention relates to a method for replacement of electrodes in an electric arc furnace with an electrode roof removable from the furnace shell and to an apparatus for carrying out the method.

When operating an electric arc furnace there is a continuous consumption of the electrodes and consequently the electrode rows must at times be joined with new electrodes.

Today there are many different methods of jointing electrodes. According to one of these, the jointing of an electrode row with a new electrode is done when the used electrode is in its holder above the furnace shell, and according to another method the used electrode row is lifted out of the holder and replaced with another electrode row which has been jointed with a new electrode in a special jointing unit.

Both of these methods suffer from considerable disadvantages from a safety as well as environmental point of view as the personnel has to stay on the more or less leaky furnace roof during the jointing and the lifting moment, respectively. Furthermore, both methods take a a lot of time compared with the method according to the invention.

The present invention provides a method and an apparatus for replacing the electrodes of an electric arc furnace, whereby all of these disadvantages are avoided.

The characterizing features of the invention will appear in the appended claims.

The invention is especially useful connected with what is called a twin shell furnace, i.e. an electric arc furnace with two furnace shells and an electrode roof movable between them but it is also applicable to usual electric arc furnaces.

The invention will be described below with reference to the accompanying drawings which show an example of using the invention in connection with a twin shell furnace.

Figure 1:
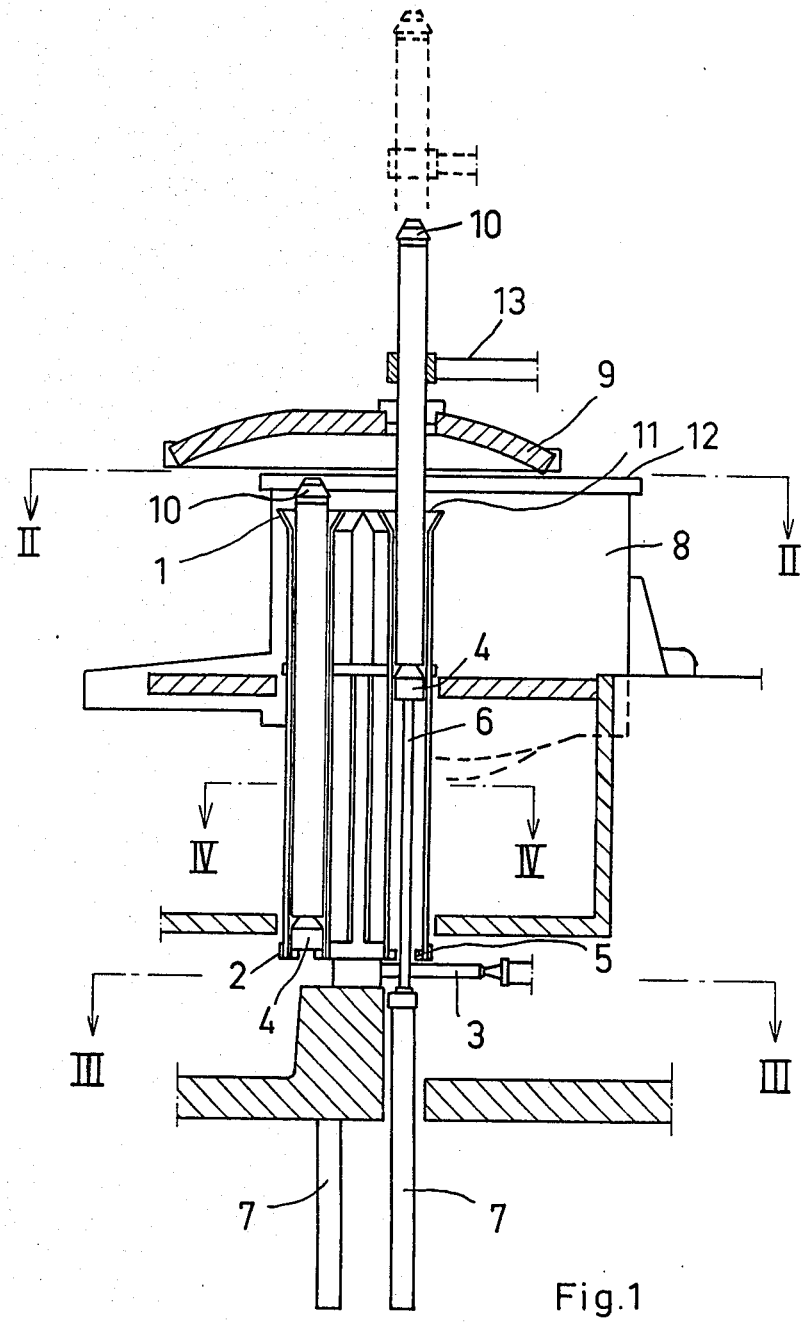
FIG. 1 is a longitudinal section of the apparatus.
Figure 2:
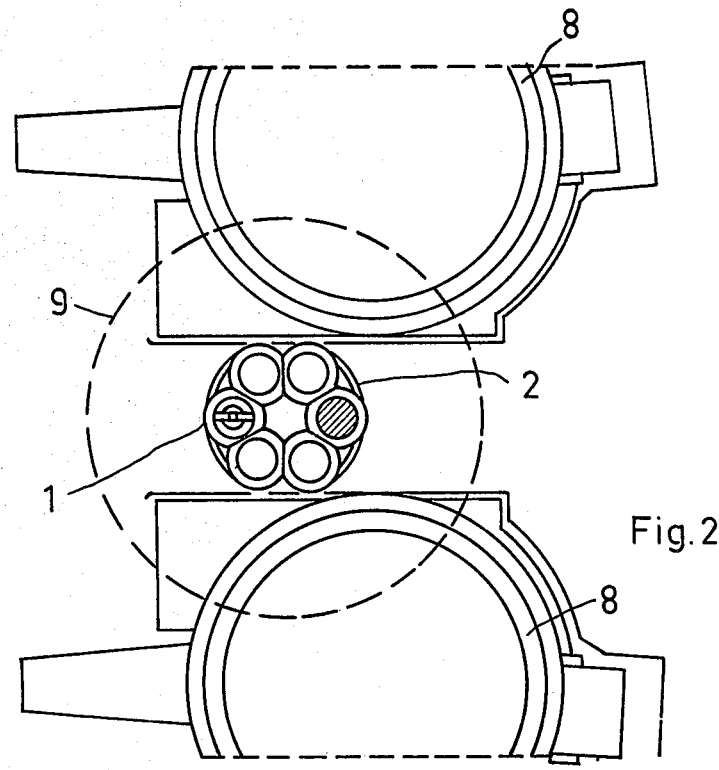
FIGS. 2, 3 and 4 show cross sections along the lines II—II, III—III and IV—IV of FIG. 1.
Figure 3:
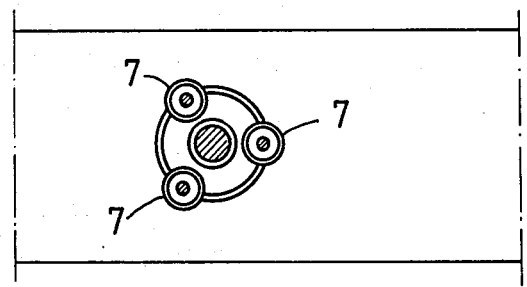
Figure 4:
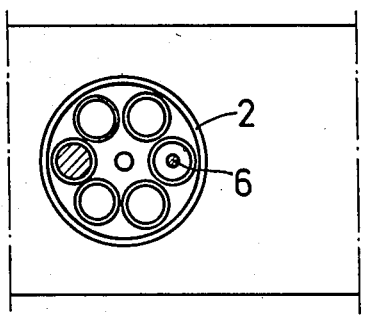

The apparatus comprises six tubes 1, located on a circle with an angle of 60° included between the centers of the tubes on a disc 2, which is brought into rotation by means of a shaft 3, driven by e.g. an electric motor, not presented in the figures. The pitch circle diameter of the tubes equals the diameter of the electrode circle and the inside diameter of the tubes is slightly bigger than the diameter of the electrodes. Each tube comprises a moving piston 4, which in its lowest position rests on a flange 5 inside the tube. The piston 4 is operated by a piston rod 6 in each one of three cylinders 7 which are located exactly below every second tube and consequently at an angle of 120°.

The apparatus is placed between the furnace shells 8 so that the electrode circle coincides with the pitch circle of the tubes when the electrode roof 9 is swung into a position between the furnace shells.

At that position the centers of the cylinders furthermore are coinciding with the centers of the electrodes.

The length of the tube is adjusted so that the major part of an electrode row resting on the piston in its lowest position is covered by the tube. Only a smaller part, corresponding to a lifting nipple 10 at the top of each electrode row, is left possible to seize above the tube by using a lifting device (not shown) when the piston is in its bottom position. The top plane 11 of the apparatus is arranged at a suitable level below the top 12 of the furnace shells so that the electrode roof, having three electrode inlets at an included angle of 120°, can be freely movable over the apparatus charged with new connected electrodes.

The method according to the invention carried out in an apparatus according to above described example will now be described by way of the following examples of simultaneous exchange of three electrodes in a twin shell furnace. In the apparatus, an electrode row which has been jointed in advance, is placed into every second tube. The electrodes in the furnace are lifted up so that the roof and the electrodes can be swung into a position between the furnace shells. The disc 2 is turned so that the empty tubes are located exactly below the used electrodes. The electrodes are lowered as far down as the electrode holders and the roof make it possible and into the empty tubes. By means of the cylinders situated below the empty tubes, the pistons belonging to the cylinders are raised as high as up to their contact with the electrodes. The braces of the electrode holders are opened whereupon the pistons together with the electrodes are lowered so far down in the tubes that they are disengaged from the holders and the electrode roof.

Then the piston rods 6 are lowered a little further below the bottom of the pistons 4 resting on the flanges in the bottom of the tubes. The disc 2 thereafter can be turned 60° so that the tubes containing the new electrode rows are brought into a position exactly below the holders 13. The electrodes are pushed up into the holders whereby the cone-shaped lifting nipples are serving as guides.

The braces of the holders are closed, the electrodes are lifted and the roof together with the electrodes is swung to the desired furnace shell.

The used electrode rows can later on, at a suitable opportunity, be replaced by new electrode rows.

It has been already stated that substantial savings of time and cost are attainable by replacing electrodes in a way according to the invention. With the above mentioned conventional methods 30 minutes are required at present for replacing three electrodes whereas the same replacement is carried out in 5 minutes with the method according to the invention.

At a production level of e.g. 300,000 tons annually the production thereby can be increased by 10,000 tons annually.

The application of the invention is not limited to the embodiment described above with reference to the accompanying drawings but can of course be modified within the limits of the claims.

What is claimed is a:

1. Method of replacing electrodes in an electric arc furnace having an electrode roof containing used electrodes movable between the furnace and a cartridge containing new electrodes positioned outside the furnace shell consisting of the steps of positioning the used electrodes in the electrode roof above a plurality of tubular members defining the cartridge, lowering the used electrodes into a corresponding number of tubular members of the cartridge, aligning the tubular members of the cartridge with new electrodes to the position of the used electrodes after lowering, displacing the new electrodes within the cartridge to a position adjacent to the electrode roof, moving the electrode roof and the new electrodes to the desired furnace.

2. The method of replacing electrodes as claimed in claim 1 wherein the step of aligning the cartridge includes rotating the tubular members on a disc disposed below the cartridge.

3. The method of replacing electrodes as claimed in claim 1 wherein the steps of lowering and displacing the electrodes includes supporting the electrodes by a piston rod assembly located below the electrodes in the cartridge and movable within the cartridge.

4. Method for replacing electrodes as claimed in claim 1 wherein the steps of aligning the cartridge includes arranging the tubular members in a circular array.

5. Apparatus for replacing used electrodes with new electrodes of an electric arc furnace having a removable electrode roof actuatable between an inner position above the furnace and an outer position adjacent the furnace shell comprising a cartridge having a plurality of tubular members underlying the electrode roof in its outer position and adapted to receive the new and used electrodes, aligning means for selectively situating the cartridge relative to the electrode roof to a first position for inserting the used electrodes and to a second position for removal of the new electrodes from the cartridge.

6. An apparatus for replacing electrodes as claimed in claim 5 wherein said cartridge includes piston rods movable within each tubular member for supporting each electrode.

7. An apparatus for replacing the electrodes of an electric arc furnace as claimed in claim 5 wherein said tubular members alternately receive the new and used electrodes.

8. An apparatus for replacing the electrodes of an electric arc furnace as claimed in claim 5 wherein said aligning means includes a disc having the cartridge seated thereon and rotatable to selected positions beneath the electrode roof.

* * * * *